July 2, 1968    H. GOLDSMITH    3,390,962
BIOCHEMICAL TEST PLATE
Filed Sept. 1, 1965

United States Patent Office 3,390,962
Patented July 2, 1968

3,390,962
BIOCHEMICAL TEST PLATE
Herbert Goldsmith, Rockville, Md., assignor to National Instrument Laboratories, Inc., Rockville, Md., a corporation of Maryland
Filed Sept. 1, 1965, Ser. No. 484,401
4 Claims. (Cl. 23—253)

The present invention relates to the subject matter of copending application, Ser. No. 432,283, filed Feb. 12, 1965, by Calvin A. Saravis.

More specifically, the present invention relates to an apparatus for carrying out semiqualitative, semiquantitative biochemical reactions (e.g. immunodiffusion reactions) on various preformed sheet media, including microporous films such as microporous cellulose acetate.

Briefly immunodiffusion involves reactions, e.g., between an antigen and an antibody, effected in semi-solid media, commonly agar. Both reactants are intially soluble in the carrier, but the reaction product (or complex) as insoluble and may be observed visually or photographically. For further background on immunodiffusion reference is made to the widespread literature on this subject. Particularly noteworthy is the text entitled "Immunodiffusion," by A. J. Crowle; published by Academic Press, New York (1961).

To examine fully the reactions between an antigen and antiserum, a serial dilution from antigen excess to antibody excess is essential. Frequently with an excess of either reactant no precipitate results, while at the proper concentration of the two precipitates will form. When several antigens are to be compared by the Ouchterlony technique using the same antiserum, the optimum concentration of each antigen should first be determined and this antigen concentration placed in the Ouchterlony well. In the same way, the antiserum titer and the maximum spectrum of reactions should be determined.

The present invention relates to an apparatus for the facile determination of the immunoprecipitin titer of an antigen-antibody reaction and for determining the antigenic similarities between several antigens when each is at its optimum concentration for the precipitin reaction.

For further understanding of the present invention, reference is now made to the attached drawing wherein.

Figure 1:
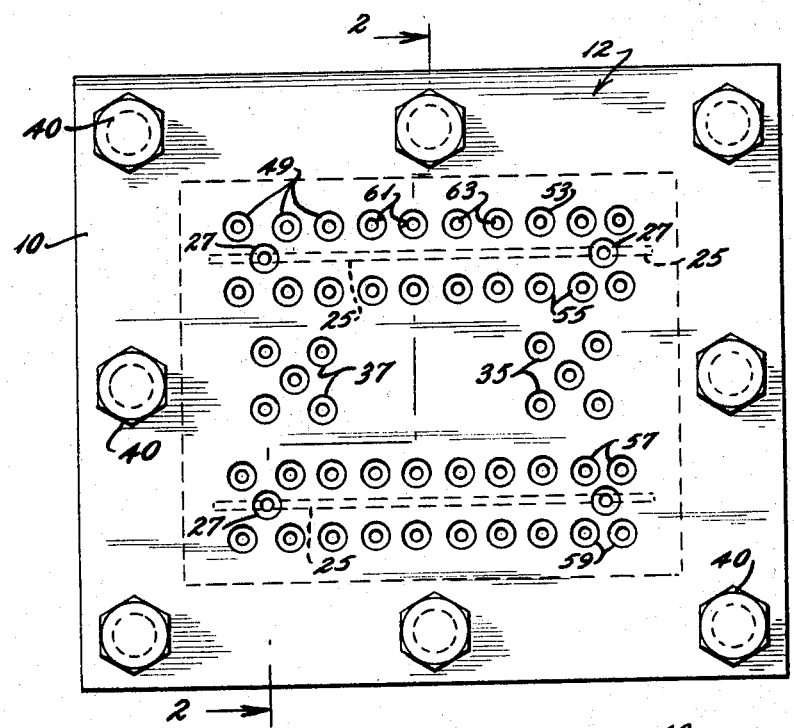
FIG. 1 illustrates a plan view of the assembled apparatus acording to the present invention.

As shown in the drawing the assembled immunodiffusion apparatus or plate comprises a face member or template 10 with a smooth planar upper and lower surface 12, 14; an elastomeric pad 20; and a back-up plate or base 30. Conveniently, template 10 and back-up plate or base 30 may be constructed from transparent, preferably autoclavable materials, such as glass or polycarbonate resins. Acrylic resins (Lucite) have proven particularly suitable, although they are not autoclavable. Still other transparent (or even translucent resins) like polypropylene, polyethylene, styrene, etc. may be employed.

Figure 4:
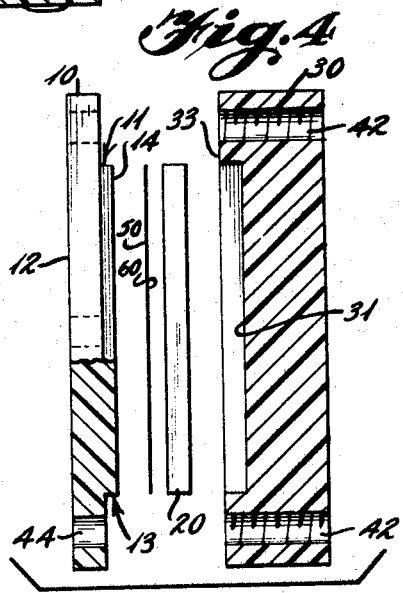
FIG. 4 is an exploded side view of the components.

It may be seen (best in FIGS. 2 and 4) that lower surface 14 of template 10 is on a boss 11 formed on the underside of template 10 by removal of the lower peripheral margins of template 10 leaving a peripheral cut away portion 13. Correspondingly, back-up plate 30 is provided with a rectangular recess 31 of dimensions corresponding to boss 11, preferably but not necessarily being just enough larger so that the raised marginal edge portion 33 on back-up plate 30 will clear boss 11.

Figure 2:
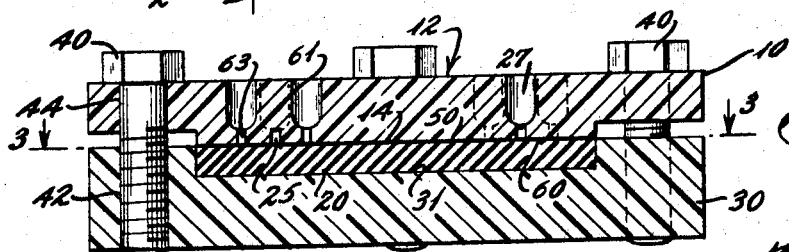
FIG. 2 is an enlarged section taken along line 2—2 of FIG. 1.
Figure 3:
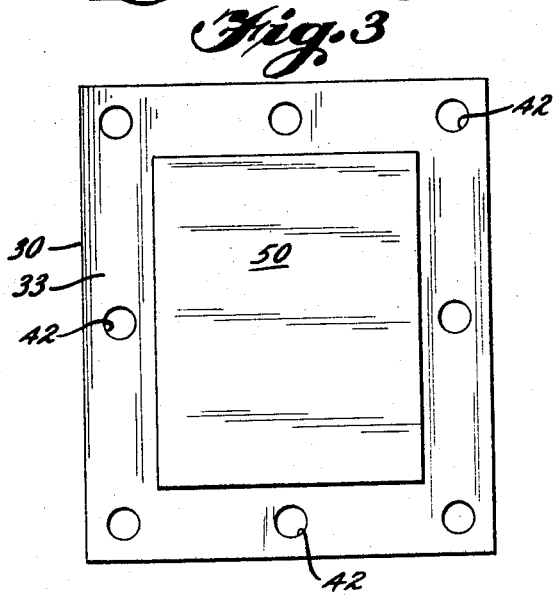
FIG. 3 is a plan view of the back-up plate or base of the apparatus taken along line 3—3 of FIG. 2.

Referring now to FIG. 2 wherein is shown the assembled apparatus, a microporous film 50 (e.g., microporous cellulose acetate) disposed beneath template surface 14 and coextensive therewith. Underlying microporous film 50 is a film 60 formed from a water impermeable resin, e.g., regenerated cellulose (Parafilm), polyvinylidine chloride (Saran), polyethylene, etc.

Elastomeric pad 20 dimensioned to fit tightly inside rectangular recess 31 is disposed therein. Desirably, pad 20 the height of which is less than the depth of recess 31 and should not therefore clear the marginal edge portion 33 of base 30. Suitably, pad 20 is a rubber of 20–30 durometer hardness. Neoprene has been found particularly suitable. Correspondingly the depth of boss 11 is sufficient to enter recess 31 and press against pad 20 as is shown in FIG. 2.

While immunodiffusion reaction tests carried out in microporous films are often more sensitive than those done with conventional semi-solid media such as agar, at the same time there arises need for completely reproducing the physical conditions of the plate from test to test. For example, the desirability of maintaining microporous film 50 smooth is self-evident. Also desirable is maintenance of film 50 under uniform conditions of compressive stress.

The present immunodiffusion apparatus provides a structure which maintains films 50, 60 smooth between elastomeric pad 20 and the lower surface 14 of template 10, the area of films 50, 60, the pad 20 and boss 11 being essentially equal. After assembly (as shown in FIGS. 1, 2) the various components are secured together by a multiplicity of threaded bolts 40, eight being illustrated. Appropriate threaded openings 42 are provided in marginal side portions 33 of base plate 30 with matching smooth bore apertures being provided in template 10 above the cut-away side marginal portion 13. Desirably, the bolts are formed of autoclavable material such as nylon, etc.

Upon assembly the bolts 40 are tightened to a predetermined torque level (with conventional metered wrenches), 5 in. lbs. being recommended. As can be readily appreciated, the compressive stress applied by the tightened bolts is transmitted through the rigid template material and through the rigid base plate material uniformly across the area of contact between these members. In short, uniformly across the area of films 50, 60. Compression of compliant pad 20 ensures uniform distribution of this compressive stress to film 50.

Since the bolts 40 are always tightened to the same predetermined torque level, immunodiffusion tests (using the same reagents and microporous film) are completely reproducible. Such reproducibility is important. Frequently immunodiffusion reactions are so sensitive that they are affected materially by variations in the stress level on the film 50 even to the point where it becomes difficult to distinguish between over substantive differences in test results and variations due to film condition.

A plurality of spaced apart apertures 49 penetrate through template 10 from the upper planar surface 12 to lower planar surface 14. The nature and inter-relationship of these apertures are important. As shown in the drawing, sequences of identical apertures are arranged in parallel columns 53, 55, 57 and 59. It should be noted how the columns are arranged in pairs, e.g., 53 and 55, 57 and 59. Equidistant between the columns 53 and 55 and also between 57 and 59 is a slot 25, hereinafter termed a trough, milled on the underside of template 10. A filling hole 27 is provided at each end of trough 25. Also at least two sets 35 and 37 of apertures are disposed in the central portion of template 10, each set 35, 37 being arranged in an Ouchterlony pattern, wherein four peripheral apertures are on center around a centrally located aperture.

Each of the apertures 49 comprises a cup-shaped depression 61 extending partly through the material of template 10 and a bore 63 extending from the base of cup-shaped depression 61 axially thereof through to lower planar surface 14.

When template 10, films 50, 60, pad 20 and a back-up plate 30 are assembled in that order with film 50 in contact with lower surface 14 of template 10 in the manner shown in FIG. 2 of the drawing and the entire assembly secured with bolts 40 torqued up to a predetermined stress, e.g., 5 in. lbs., film 60 serves to insulate and protect resilient pad 20 from contact with the immunodiffusion carrier and the reactants. Presence of film 60 is not absolutely necessary but it is conducive to better resolution of the immunoprecipitin reactions.

After assembly of the immunodiffusion plate, a drop of buffer or saline, e.g., isotonic sodium chloride solution (0.85%) may be placed into each aperture to saturate the underlying microporous film 50. A brisk upside down shake is then used to empty the apertures of any free fluid and the assembly disposed upside down on towelling to remove remaining fluid. Thereafter the cup-shaped depressions 61 are all loaded with a constnat amount of diluent (0.025 ml. or 0.05 ml.).

The present apparatus is particularly adapted for carrying out a complex test sequence in which a constant concentration of antibody is disposed in troughs 25 and serially diluted serum or antigen is placed individually into the cup-shaped depressions 61 of the apertures, thereby measuring the immunodiffusion precipitin reaction over an extremely wide concentration range. The cup-shaped depressions 61 are specifically designed to accept the Takatsy microtitration loops (0.025 ml. or 0.05 ml.). In the first cup-shaped depression 61 antigen is charged directly to the diluent with the Takatsy loop (0.025 ml.), the liquid stirred to mix it well, and the same loop employed to transfer a more dilute antigen to the next adjacent depression 61, again stirring until homogeneous solution is obtained and again removing an aliquot for charging to the third depression 61 and so on. With ten apertures disposed in each column 53 and 55 an exceedingly wide range of concentration is obtained in this fashion (i.e. $2^{20}$). Even so, for very strong reactions, the antigen, if greatly in excess, might require an initial substantial dilution. Simultaneously, the Ouchterlony pattern test may be carried out with the same reactants using the Ouchterlony pattern set 35 and 37.

In a single test "slide" (i.e., microporous film 50) with the same antigen and antibody, the antigen can be serially diluted in the depressions 61 of the apertures in columns 53 and 55 while a constant strength antibody fills trough 25 therebetween. In the depression 61 of the apertures in columns 57, 59, antibody can be serially diluted while a constant strength antigen fills trough 25 therebetween. Similarly the Ouchterlony patterns can be determined for the antigen v. antibody in one group, e.g. 35 and the antibody v. antigen in the other group, e.g. 37.

Thus for different immunoprecipitin reactions the parameters for optimum reactions may be derived expediently by the use of the present apparatus and the above described procedure.

After the apertures and troughs are appropriately loaded with reactants the plate is placed in a humid chamber for the development of the precipitin lines. Following dull development of the precipitin lines, the plate is disassembled and microporous film 50 retrieved therefrom. Usually the unreacted protein, together with salts and water is removed from film 50 either by washing in buffered saline solution or by adsorption into facial tissue placed on film 50, or by a combination of both. After the precipitin lines are stained and cleared, film 50 may then be photographed and stored as a permanent record of the immunodiffusion tests.

To further illustrate that the above described technique and equipment can be employed in lieu of test tube dilution techniques, the following comparative test run was made.

Clean components, i.e., Plexiglas (an acrylic resin) templates and back-up plate, a Neoprene pad, a saline wetted commercially purchased cellulose acetate microporous film and commercially purchased regenerated cellulose (Parafilm), were carefully assembled into four immunodiffusion plates using 5 in. lbs. torque on the bolts.

Two of the immunodiffusion plates were used for test tube dilutions. Two tenths of normal human serum were two fold serially diluted with 0.2 ml. of phosphate buffer in each tube for 20 tube dilutions. Melting point capillary tubes (1.5–2.0 mm. I.D.) were used to transfer approximately 0.01 ml. of each dilution to its respective aperture. The wells of one of the plates were loaded with Hyland Horse antihuman serum while that of the other plate were loaded with horse antihuman serum produced by the Netherlands Red Cross.

The two remaining plates were used for dilutions made directly in the plate using a Takatsy microtitration loop. Drops of buffer were briefly put in the wells and depressions and then removed by a brisk upside down shaking. After 0.025 ml. of buffer was placed in each aperture the Takatsy loop (0.025 ml.) loaded with human serum was placed in the first depression. After twirling, the loop was transferred to the second depression and the transfer repeated in the same manner from aperture to aperture to the end of the line of depressions and around to the other side of the well through the depressions there. One plate was similarly loaded with the Hyland antiserum while the other with the Netherlands Red Cross antiserum.

The plates were placed in a humid chamber and incubated 48 hours at room temperature. The wells and apertures were rinsed with isotonic saline solution; then the plates were disassembled. The cellulose acetate films were placed in isotonic saline pH–7 for 30 minutes with several changes of the eluant, then stained for 5 minutes with Ponceau S dye and cleared by immersing in 5% of acetic acid for a few minutes. Thereafter photographs were taken.

Comparison of the test tube dilution plates with the Takatsy dilution plates showed little if any differences. Both had titers of $\frac{1}{2000}$ with the Hyland antiserum and $\frac{1}{32,000}$ with the Netherlands Red Cross antiserum. With the latter antiserum many more lines were seen in the first dilutions, showing a broader spectrum of immunoprecipitin reactions.

While the above description of the present biochemical test plate has been almost entirely in relation to immunodiffusion tests, a preferred embodiment thereof, the apparatus of the invention can be employed also for other biochemical tests involving separation, and reaction phenomena i.e. microelectrophoresis, immunoelectrophoresis, etc. Provision can be made readily in template 10 for appropriate electrical connections.

It will be obvious to those skilled in the art that various changes may be made without departing from the spirit of the invention and therefore the invention is not limited to what is shown in the drawings and described in the specification but only as indicated in the appended claims.

What is claimed is:

1. A biochemical test plate comprising: a planar template containing an ordered plurality of spaced apart apertures therethrough, said template having a central boss on the underside thereof; a microporous film underlying said template at the central boss thereof, and essentially coextensive with the central boss thereon; a resilient pad essentially coextensive with the microporous film; a back-up plate containing a central recess into which said resilient pad and said central boss fit, the height of said pad being less than the recess depth; and attachment means associated with the marginal edge portions of the back-up plate surrounding said recess and with the marginal edge portions of the template surround the boss for securing together the test plate, the microporous film then being under a substantially uniform state of stress.

2. The apparatus of claim 1 wherein a water impervious film is disposed between the microporous film and resilient pad.

3. The apparatus of claim 1 wherein a multiplicity of bolts serve as the attachment means.

4. The apparatus of claim 3 wherein threaded openings in said back-up plate for the bolts pass completely through said back-up plate.

No references cited.

MORRIS O. WOLK, *Primary Examiner.*

R. M. REESE, *Examiner.*